US011184772B2

(12) United States Patent
Douglas et al.

(10) Patent No.: US 11,184,772 B2
(45) Date of Patent: Nov. 23, 2021

(54) SECURE COMMUNICATION PLATFORM

(71) Applicant: BIOCONNECT INC., Toronto (CA)

(72) Inventors: Robert Douglas, Toronto (CA); Pritesh Yogesh Patel, Burlington (CA); Anthony Snell, Toronto (CA); Courtney Ryan Gibson, Toronto (CA); Josh Solomon, Toronto (CA)

(73) Assignee: BIOCONNECT INC., Toronto (CA)

( * ) Notice: Subject to any disclaimer, the term of this patent is extended or adjusted under 35 U.S.C. 154(b) by 169 days.

(21) Appl. No.: 16/683,858

(22) Filed: Nov. 14, 2019

(65) Prior Publication Data

US 2020/0154278 A1 May 14, 2020

Related U.S. Application Data

(60) Provisional application No. 62/767,278, filed on Nov. 14, 2018.

(51) Int. Cl.
*H04B 5/00* (2006.01)
*H04W 12/08* (2021.01)
*H04W 4/80* (2018.01)
*H04W 4/029* (2018.01)
*G06Q 20/32* (2012.01)
*H04W 12/06* (2021.01)
*H04L 9/32* (2006.01)

(52) U.S. Cl.
CPC ........ *H04W 12/08* (2013.01); *G06Q 20/3278* (2013.01); *H04W 4/029* (2018.02); *H04W 4/80* (2018.02); *H04W 12/068* (2021.01); *H04L 9/3242* (2013.01)

(58) Field of Classification Search
CPC ....... H04W 12/08; H04W 4/029; H04W 4/80; H04W 12/068
USPC ........................................................ 455/41.1
See application file for complete search history.

(56) References Cited

U.S. PATENT DOCUMENTS

| | | | |
|---|---|---|---|
| 8,929,805 B2 * | 1/2015 | Yu | G06K 19/077 455/41.1 |
| 2012/0158467 A1 * | 6/2012 | Hammad | G07F 7/1008 705/13 |
| 2013/0178159 A1 * | 7/2013 | Xie | G06Q 20/40 455/41.1 |
| 2014/0256251 A1 * | 9/2014 | Caceres | H04W 12/084 455/41.1 |
| 2017/0178115 A1 * | 6/2017 | Todasco | G06Q 20/367 |

\* cited by examiner

*Primary Examiner* — April G Gonzales
(74) *Attorney, Agent, or Firm* — Norton Rose Fulbright Canada LLP

(57) ABSTRACT

Systems, devices, methods, and computer readable media for electronically controlling a user's access to one or more controlled resources are provided. A near-field communication-based mobile credential data payload is provisioned on a mobile device capable of establishing a contactless payment transaction and a low energy proximity beacon signal is periodically broadcasted. The beacon signal and an emulated contactless payment transaction can be utilized in concert to determine that the identity is authorized to access the one or more controlled resources.

20 Claims, 12 Drawing Sheets

SECURE COMMUNICATION PLATFORM

CROSS-REFERENCE

This application is a non-provisional of, and claims all benefit, including priority, of U.S. Application No. 62/767,278, entitled "SECURE COMMUNICATION PLATFORM", filed on Nov. 14, 2018, incorporated herein by reference in its entirety.

FIELD

Embodiments of the present disclosure relate to the field of electronic access control, and more specifically, embodiments relate to devices, systems and methods for beacon or mobile credential based access control.

INTRODUCTION

Improving access security is a difficult balance between convenience and security.

Digital access control is described in various embodiments herein, which is distinct from a physical access control type card (e.g., a physical key).

The digital access control can be used for virtual access security (e.g., controlling login access in an operating system) and/or physical access security (e.g., controlling whether a door should be opened).

Virtual access security is important for protecting valuable or sensitive information, such as customer information, transactional data, and physical access security is important for ensuring only authorized personnel are able to physically access one or more secured resources, such as secured locations, tools, devices, etc.

Increased security measures decrease a probability of a breach or unauthorized access, however, the cost of increased security measures is an increased level of friction arising from inconveniencing users. The increased friction, for example, may increase the amount of time required for a successful authentication, which may lead to frustration or attempts to circumvent the system.

SUMMARY

Devices, apparatuses, systems, methods, processes, and computer readable memory having machine-interpretable instruction sets are described in various embodiments herein.

Specific approaches to secure beacon or mobile credential based access control are described that provide improved scalability and security by leveraging mobile pass and mobile payment mechanisms to communicate a specially generated mobile credential data payload.

The mobile payment mechanisms using, for example, close proximity communications protocols (e.g., near-field communications) can be used to deliver the specially generated mobile credential data payload by emulating a contactless payment transaction. In various embodiments, a number of different approaches are described for generating and processing the mobile credential data payload, which can be a portion of an electronic token stored on an electronic "wallet".

A challenge with alternate "contactless" technologies, such as passive smart cards/proximity cards/security pass cards, is that physical components and memory are limited by the geometry of the physical card and the electronics stored thereon (antenna, capacitor, integrated circuit), and power/cost requirements of the components. These physical and power limitations reduce the ability for strong security practices to be implemented.

As memory is constrained, the ability to use more secure cryptography techniques is not possible, and in many situations, passive smart cards may simply store information statically representing a facility number (e.g., facility code identifier) and a card number (e.g., card set identifier).

When presented to a reader, the passive smart cards are configured to transmit this information and the reader validates whether the holder of the passive smart card should be allowed access. This system is static and prone to system vulnerabilities as the encoding (if any) is limited by the constrained electronics on the card. Furthermore, there is no ability to modify what is stored thereon without effectively reissuing a card.

As described in various embodiments herein, the mobile credential data payload increases the ability for dynamic control over access provisioning. In particular, the payload can be encoded in accordance with a hash-based message authentication code (HMAC) approach which can include types of message authentication code (MAC) involving a cryptographic hash function and a secret cryptographic key (the "secret"). The secret cryptographic key can be used, for example, by an on-premises system or a computing resource cloud-based system, to confirm that a message is authentic. If the secret is stored locally and generated locally, it can be used to generate a pass that cannot be regenerated without the secret, preventing a cloud-based access control system from generating its own passes.

The HMAC can be associated with information such as a passtype identifier (e.g., tied to a company), certificate identifier, user identifier, and system identifiers, among others. A pass can be readily modified or invalidated, more precise access controls can be established using the mobile credential payload.

In an embodiment, a beacon-based approach for electronically controlling a user's access to one or more controlled resources is described, the controlled resources including digital resources, physical resources, and combinations thereof. In some embodiments, a device is provided that is adapted for retrofit and interoperation with existing access control systems, for example, by emulating communications and adding an increased level of security. In this embodiment, the beacon mechanism provides an additional layer of security in combination with the provisioning of the mobile credential token.

A controller device includes or is coupled to a beacon transmitter that transmits a low-energy proximity beacon signal that is periodically broadcast, and the device can reside proximate or coupled to an access control mechanism, such as a secured door, rack, cabinet, etc. A secured area may have an unsecured side and a secured side, and aspects of the device may reside on the unsecure side of a threshold (e.g., near-field-communication reader), and other aspects may reside on the secure side (e.g., beacon transmitters).

The beacon broadcast signal is a one way communication from the beacon source, and a mobile application residing on mobile devices associated with the users interacts with the beacon signal and transmits, across one or more communication networks, a data element representative of the strength of the beacon signal. If more than one beacon is in range, the actual location of the user can be triangulated based on known positions of the beacon signal sources. In some embodiments, a secondary, encrypted beacon signal may be generated that may be used as an additional beacon signal to be used as an additional security layer or for triangulation, and the encrypted beacon signal may be generated from a source on a secure side of an access control threshold (e.g., on a secure side of a door so it can't be easily tampered with). The beacon signals, in some embodiments, can be adapted to carry information packets, such as broadcasted messages, etc. Example encoded messages are provided in a later paragraph, and these can include rolling codes, access levels, among others.

As noted below, the beacon signal can be utilized for different functions, such as cross-validation with a near-field-communication based credential, broadcasting information regarding the controlled resources (e.g., level 1 door has shifted to become a level 3 door, requiring the user to authenticate with fingerprint on the user's mobile device in addition to the level 1 authentication requirements), determining characteristics of movement relative to the beacon source (e.g., signal strength increases, and then decreases, indicating that perhaps the user went through the door), tracking position (if there is more than one beacon or another data source to validate against).

In some embodiments, the approach includes provisioning a near-field communication-based mobile credential data payload on a mobile device capable of establishing a contactless payment transaction, the near-field communication-based mobile credential data payload representative of an identity associated with the user. Contactless payment transactions are configured to allow for the transmission of additional secure information over near-field communications, for example, using "value added services"-based protocols, integrated into purchase processes.

While the additional secure information, when connected with a purchase transaction, can include loyalty program information, the additional secure information can instead be replaced with the mobile credential data payload or derivatives thereof such that the contactless payment transaction process can be utilized instead for credential-based access control provisioning.

An example mobile credential data payload is a data set representative of a digital passcard, which may include, for example, workplace based identifiers, photos, or other identifying data, tied to the identity of the user. This mobile credential data payload is stored thereon and can be used to interact with existing wireless transaction systems that exist on the mobile device, including near-field-communication based approaches where a tokenized representation of the mobile credential data payload is transmitted across payment communication rails to authorize a financial transaction.

The tokenized version of the mobile credential data payload (tokenized data packet) can be cross-validated with the beacon response from the mobile device, among other factors, for validation to determine whether access should be provisioned. The tokenized data packet can emulate the contactless payment transaction such that a zero dollar transaction is processed, or in some embodiments, a transaction value is also associated with the access provisioning attempt (or successful access provisioning), which can be useful in implementations such as cruise ship access cards or theme park access devices (such as wristbands). A second data packet can be received by the system across a communication network indicating the identity associated with the user.

Access can be provisioned through the generation of control signals which are adapted to actuate locking mechanisms, lift gates, unlock magnetic locks, etc. Where the device is coupled as a retrofit to an existing legacy access control system, the device may further generate signals adapted to emulate commands for interoperation with the existing legacy access control system.

In an aspect, a dual-custody type access requirement is imposed whereby two mobile devices require authentication using both near-field-communication and beacon validation, among others, to be able to obtain access to protected resources. An example dual custody situation can include a retail store situation where a valuable electronic item is being taken out of a display case and a manager needs to also provide credentials in addition to a retail store salesperson to unlock the display case. There may be more than two devices needed to provide authentication (e.g., multi-user custody example).

In an aspect, determining that the identity is authorized to access the one or more controlled resources includes conducting a limited query only against a plurality of identities each associated with a corresponding mobile device having a relative position characteristic within a pre-defined distance from the low energy proximity beacon signal.

This approach enables a reduced search space, and the identity information for validation may be primed for ease of access, for example, through pre-loading in a faster cache at a validation device and pulled automatically from a directory service. This embodiment is particularly useful for high-traffic volume implementations (e.g., a subway) or where a large amount of data is required for validation (e.g., an extremely high security door requiring over ten elements for validation).

In an aspect, the system is adapted for tracking a plurality of relative position characteristics. Each of the relative position characteristics correspond to a mobile device of a plurality of mobile devices proximate a source of the low energy proximity beacon signal to track multiple mobile devices.

Upon provisioning access to the one or more controlled resources, the relative position characteristics are used to determine which mobile devices entered an area associated with the one or more controlled resources (or other information, such as video-based human presence tracking systems).

Upon determination of a mobile device associated with an identity that was not validated for access to the one or more controlled resources entering the area associated with the one or more controlled resources, an alarm can be triggered.

A number of people in a room may be counted or a number of people crossing a particular threshold and mapped against a number of validated users such that if there is a discrepancy, an alarm state may be triggered.

In an aspect, in addition to the beacon signals, sensors on the mobile devices, including GPS, gyroscopes, accelerometers, heartbeat sensors, etc., are utilized to correlate aspects of the user's identity, such as gait, how a device is being held, whether a device is in a pocket, etc. In a further aspect, the additional sensory information may be used for passive step up authentication where security levels have been increased or a higher level of security is required for a particular controlled resource (e.g., this is a level 6 door, which authenticates via gait as well as near-field-communication, GPS, and beacon).

In a further aspect, the signal strength increase and decrease relative to the beacon position is correlated against the GPS coordinates and/or signal strength of other known transmitters (e.g., WiFi, cellular towers) to add an additional level of spoof protection against simply reading beacon signal strengths.

In an aspect, information extracted from the mobile device is used for passive step up authentication, such as a most played song, a list of installed applications, accessibility settings, nearby WiFi signals, carrier name, IMEI, IMSI, photo album names, stored certificates, etc.

In an aspect, the system may be utilized to require step up of a selected subset of users—for example, in a muster call in a fire drill, the user who is the responsible fire warden may be required to provide additional authentication.

In an aspect, the system may track a number of authorized user in a protected area and corresponding step up or step down authentication of additional users that seek access— for example, there may be a rule that if anyone is alone in a data center, the access requirements are automatically increased such that only high level administrators are allowed to be alone in the data center.

In an aspect, the beacon signal can be coupled with a broadcasted message, for example, indicating that a particular change in security settings has been established and a higher level of step up is now required.

In a further aspect, where a heightened security setting is in effect, a user, while in range of the beacon signal, may be able to conduct a step up authentication that is applicable for a pre-defined duration of time (e.g., additional security settings that are valid for 30 minutes to establish a higher level of trust).

Situations which require a higher level of trust, for example, include where there is a "Level 7 door" which not only requires near-field and beacon validation, but also the provisioning of a password and a retinal scan. When a beacon signal is received, the beacon signal could indicate that this is a Level 7 door now (there was an attempted breach, so all prior Level 5 doors are elevated to Level 7 doors), and the password and the retinal scan could be conducted ahead of time on the mobile application, and only valid for the pre-defined duration of time.

Instead of having a backend access control system issue messages indicating the shift to Level 7 doors, in some embodiments, the beacons themselves are used to issue notifications in the encoded beacon messages indicating that the doors are now Level 7 doors, and when the mobile credentials are requested, the mobile devices immediately request enhanced credentials before being presentable as the enhanced credentials required for entry. In some cases, the enhanced credentials will need to be incorporated into the data payload being sent across the near field communication to the receiving device.

This approach may reduce the amount of time required for enhanced security requests as the round-trip latency for the various requests can be reduced, in contrast to a scenario where a user approaches a door, the door requests a security level from the backend system (50 ms), the backend system identifies it as an increased security level (10 ms), and sends back the security level to the door (50 ms), and then finally increased credentials are requested.

In the modified beacon scenario, it would immediately send out in the beacon encoded messages that this is now a level 7 door (e.g., perhaps a security level is increased due to a recent occurrence of theft from the painkiller supply closet) so all devices immediately request fingerprint validation.

Aspects described herein are applicable to various implementations relating to physical and virtual access control using digital control devices and mechanisms. The physical system may be retrofit into any existing access control platform and adapted for interoperation through signal emulation or designation of accounts that are specifically associated with the improved security system. The system may, in some embodiments, interoperate with an overall security controller which may interoperate with a directory system that, for example, is a certificate server that maintains security levels for various users in an organization.

The system may also be utilized in relation to organizations which have members of the public interfacing with their systems, such as controlling access to amusements and attractions at theme parks. Other implementations include physical access control in facilities having varying levels of security, such as military facilities, prisons, homes, workplaces, factories, etc.

The access control is not limited to doors, and can include ignition interlocks, virtual resource controllers (e.g., computer logins), latch cylinders, vending machines (e.g., for dispensation of product), among others.

Furthermore, the access control can also be utilized for transactional mechanisms whereby the contactless payment rails are not just used for credentials but also used for transactions (e.g., vending machine dispensation where money is taken from the payment method, or the opposite where someone is paid in accordance with the payment method for conducting a service such as dog walking or package delivery).

Corresponding processes, methods, devices, servers, computer readable media, are contemplated, including combinations and permutations of aspects described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
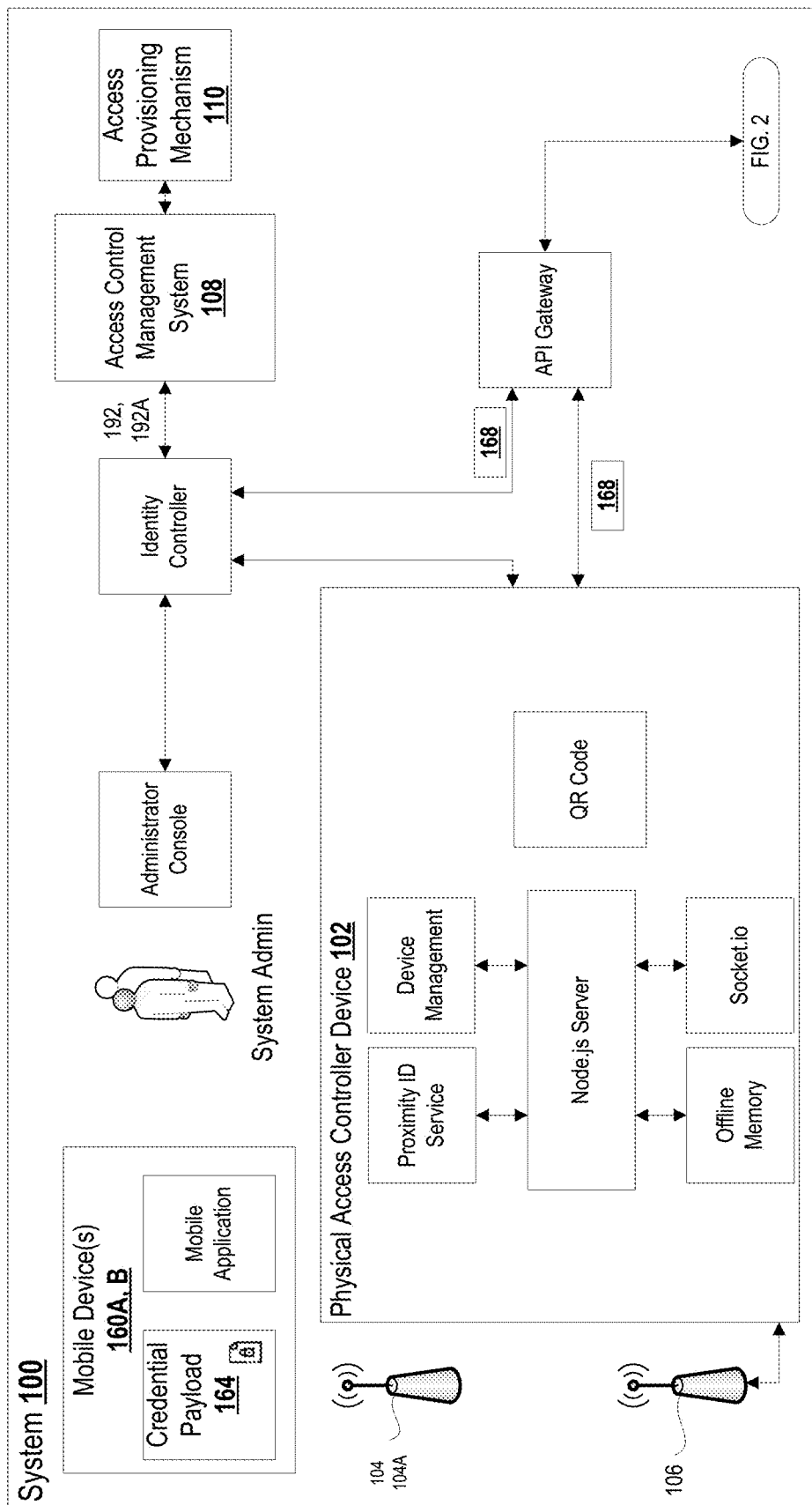
FIG. 1 is an example block schematic diagram of a system for secure access control through secure communication mechanisms, according to some embodiments.

Specific approaches to secure beacon or mobile credential based access control are described that provide improved scalability and security by leveraging mobile pass and mobile payment mechanisms to communicate a specially generated mobile credential data payload. The mobile payment mechanisms using, for example, close proximity communications protocols (e.g., near-field communications) can be used to deliver the specially generated mobile credential data payload by emulating a contactless payment transaction. In various embodiments, a number of different approaches are described for generating and processing the mobile credential data payload, which can be a portion of an electronic token stored on an electronic "wallet".

A challenge with alternate "contactless" technologies, such as passive smart cards/proximity cards/security pass cards, is that physical components and memory are limited by the geometry of the physical card and the electronics stored thereon (antenna, capacitor, integrated circuit), and power/cost requirements of the components. These physical and power limitations reduce the ability for strong security practices to be implemented.

As memory is constrained, the ability to use more secure cryptography techniques is not possible, and in many situations, passive smart cards may simply store information statically representing a facility number (e.g., facility code identifier) and a card number (e.g., card set identifier). When presented to a reader, the passive smart cards are configured to transmit this information and the reader validates whether the holder of the passive smart card should be allowed access. This system is static and prone to system vulnerabilities as the encoding (if any) is limited by the constrained electronics on the card. Furthermore, there is no ability to modify what is stored thereon without effectively reissuing a card.

A serious security breach is possible when the passive card is lost or stolen. Because the cards do not have much memory beyond storing just an identification number, when they are stolen or cloned, a malicious user can gain access to an entire facility and all of the controlled resources.

As described in various embodiments herein, an improved mobile credential data payload provides increases the ability for dynamic control over access provisioning. In particular, the payload can be encoded in accordance with a hash-based message authentication code (HMAC) approach which can include types of message authentication code (MAC) involving a cryptographic hash function and a secret cryptographic key (the "secret"). The secret cryptographic key can be used, for example, by an on-premises system or a computing resource cloud-based system, to confirm that a message is authentic.

If the secret is stored locally and generated locally, it can be used to generate a pass that cannot be regenerated without the secret, preventing a cloud-based access control system from generating its own passes. The HMAC-based data payload is a data object that can be associated with (or can encapsulate) electronic information such as a passtype identifier (e.g., tied to a company), certificate identifier, user identifier, and system identifiers, among others. A pass, in accordance some embodiments described herein, can be readily modified or invalidated, and more precise access controls can be established using the mobile credential payload.

In an embodiment, a beacon-based approach for electronically controlling a user's access to one or more controlled resources is described, the controlled resources including digital resources, physical resources, and combinations thereof. In some embodiments, a device is provided that is adapted for retrofit and interoperation with existing access control systems, for example, by emulating communications and adding an increased level of security. In this embodiment, the beacon mechanism provides an additional layer of security in combination with the provisioning of the mobile credential token.

A controller device includes or is coupled to a beacon transmitter that transmits a low-energy proximity beacon signal that is periodically broadcast, and the device can reside proximate or coupled to an access control mechanism, such as a secured door, rack, cabinet, etc. A secured area may have an unsecured side and a secured side, and aspects of the device may reside on the unsecure side of a threshold (e.g., near-field-communication reader), and other aspects may reside on the secure side (e.g., beacon transmitters).

The beacon-based approach can operate in conjunction with the mobile credential payload such that overlapping security measures are provided that seamless interoperate in concert. The approaches, as described in some embodiments, overlap with one another such that information from one can be used for encoding the other (e.g., the beacon message can be decoded to obtain a key or other mechanism for encrypting the mobile credential payload for transmission across near-field communications, or the beacon message can be included in the mobile credential payload).

The system thus includes improved technical countermeasures to malicious intruders as trying to intercept payloads or beacon signals on their own may not be sufficient to obtain access into the system. Furthermore, in some embodiments, as "step up" additional information may be required, even a stolen mobile device may not be enough for entry. Multiple overlapping beacon information may be used for additional validation that the user is actually moving through a door or near a beacon source (and the beacon signal is not simply being spoofed in a "relay attack").

For example, if a "relay attack" signal thief is near one beacon and transmitting the signal to another thief working with the thief, the presence of the additional beacons may inform the system (when decoding messages received from the mobile device either across the Internet/intranet or encapsulated in the NFC payload), that the combination signal strengths are not possible and it is possible that the system is receiving a fraudulent access attempt.

The beacons may also be used to inform mobile devices of current/increased/decreased security levels to reduce a latency period for requesting step-up challenges on the devices.

Beacon strengths can be used to assess the individuals who are near a particular beacon, and may be used to reduce the search space of the users that the system needs to authenticate against (e.g., only Bob, Eve, and Alice are near a door, so only check against Bob, Eve, and Alice instead of against all 5,000 potential matches). Beacon strengths can be used to estimate if someone actually went through a door, and multiple beacons can be used to triangulate and determine that people actually went through doors based on differences in signals between the beacons as the people move around (e.g., beacons are used to establish linearly independent vectors for movement, and if there are enough beacons, relative positions can be determined in Euclidean space).

FIG. 1 is an example block schematic diagram of a system for secure access control through secure communication mechanisms, according to some embodiments.

System 100 includes a physical access controller device 102 coupled to a beacon antenna 104 and a near-field-communication antenna 106. The physical access controller device 102, in some embodiments, is coupled to an access control management system 108 and/or an access provisioning mechanism 110.

The physical access controller device 102 is adapted for wireless interaction with a mobile device 160 that may be carried or otherwise resident on or near a user 162, the mobile device 160 having configured software or hardware thereon which interface with signals received from or transmit signals to physical access controller device 102. The mobile device 160, in some embodiments, includes networking capabilities that provide communication pathways across the Internet, the intranet, or point to point communications to a backend server device 180 that may be coupled to the physical access controller device 102.

The physical access controller device 102 can be a circuit board, such as a Raspberry Pi that is adapted to control the beacon antenna 104 and the near-field-communication antenna 106. In some embodiments, the physical access controller device 102 is adapted to retrofit to an existing access control management system 108 and emulate signals to be sent to the access control management system 108 to control the access provisioning mechanism 110 (such as a secured door, rack, cabinet, etc.).

The beacon antenna 104 generates a beacon signal that is used as a beacon transmitter that transmits a low-energy proximity beacon signal that is periodically broadcasted and received at the mobile device 160.

Aspects of the physical access controller device 102 and/or the beacon antenna 104 and the near-field-communication antenna 106 may reside on the unsecure side of a threshold (e.g., near-field-communication reader), and other aspects may reside on the secure side (e.g., beacon transmitters).

The beacon broadcast signal from the beacon antenna 104 is a one way communication from the beacon antenna 104, and the mobile application residing on mobile device 160 associated with the user interacts with the beacon signal, sending a signal across a network to indicate, for example, a signal strength.

The beacon signal may be an iBeacon™/Eddystone™ type signal, among others, which could trigger notifications to mobile devices 160 up to fifty feet away, for example. The signal may be a periodic low-energy signal, in some embodiments, whereby mobile device 160 may transmit a corresponding data packet across the communication networks indicative of a received signal strength and an identifier from the beacon from which the signal was received from (e.g., received responses −54 dB, −35 dB, −54 dB may be indicative that the user approached the beacon source and then went away from the source, which may indicate that the user potentially passed through a protected threshold after being authenticated).

In some embodiments, if more than one beacon antenna 104 is in range (e.g., there are multiple doors or there is more than one antenna on physical access controller device 102), the actual location of the user 162 can be triangulated based on known positions of the beacon signal sources.

In some embodiments, a secondary, encrypted beacon signal 104A may be generated that may be used as an additional beacon signal to be used as an additional security layer or for triangulation, and the encrypted beacon signal 104A may be generated from a source on a secure side of an access control threshold (e.g., on a secure side of a door). The beacon signals 104, 104A, in some embodiments, can be adapted to carry information packets, such as broadcasted messages, etc.

As noted below, the beacon signal from antenna 104 can be utilized for different functions, such as cross-validation with a near-field-communication based credential, broadcasting information regarding the controlled resources (e.g., level 1 door has shifted to become a level 3 door, requiring the user to authenticate with fingerprint on the user's mobile device in addition to the level 1 authentication requirements), determining characteristics of movement relative to the beacon source (e.g., signal strength increases, and then decreases, indicating that perhaps the user went through the door), tracking position (if there is more than one beacon or another data source to validate against).

A near-field communication-based mobile credential data payload 164 is provisioned on a mobile device 160 capable of establishing a contactless payment transaction. Such a data payload, can include data packets adapted for mobile payment and digital wallets, for example, which may be adapted for tokenized communications that are generated when the mobile device 160 is placed in proximity with the near-field-communication antenna 106.

The contactless payment transaction can transfer the near-field communication-based mobile credential data payload 164 or a derivative thereof during the transmission of otherwise provided payment information. Transmission of additional secure information over near-field communications can be conducted, for example, using "value added services"-based protocols, integrated into purchase processes. Value added services protocols, in certain instances, are also described as "Smart Tap" technologies. The proximity ID controller, in some embodiments, can be configured for compatibility with the value added services protocols.

The value added services aspect helps a merchant convey both payment and loyalty program information (e.g., coupons, offers, loyalty account information) into a single transaction. The near-field communication-based mobile credential data payload 164 or a derivative thereof can then be encapsulated in a data message, for example, storing a json data object that can include the message in an encoded payload. The payload 164 can be encoded in accordance with a hash-based message authentication code (HMAC) approach which can include types of message authentication code (MAC) involving a cryptographic hash function and a secret cryptographic key (the "secret"). The secret cryptographic key can be used, for example, by an on-premises system or a computing resource cloud-based system, to confirm that a message is authentic.

The json data object can, for example, store data fields, such as a message, an encryption public key, HMAC generated hashes or digests, among others. The mobile credential data payload 164 can advantageously utilize the value added service protocol as a mechanism, not for loyalty award processing, but rather, for access control into a protected facility.

The secret used in the generation of the payload 164 can be stored locally, for example, at access control management system 108 such that the secret is not provided to any cloud-based or external controller system so that any any cloud-based or external controller system cannot generate new/fraudulent payloads.

For a pass to be accepted as a data payload, the fields stored thereon are processed by the access control management system 108, which, in some embodiments, is coupled to a digital identity verification system (e.g., cloud based system or an external directory service system). The fields are validated to establish the identity of the person who is presenting the credential, verifying, for example, an employee identifier, a facility identifier, a system identifier, among others. If any of the fields are incorrect, the profile may not be matched and a rejection may occur. HMAC generated hashes or digests can be processed using the secret encryption mechanism for additional validation to ensure that the payload 164 was generated by an authentic source. In some embodiments, a time-based code (e.g., rolling code) is embedded to further reduce the susceptibility of the system to spoofing.

The physical access controller device 102 at antenna 106 emits a beacon signal that is received by the mobile device 160A, B, at a corresponding antenna. Beacon response information is captured by a mobile application. In some embodiments, the beacon signal is a rolling code that is generated dynamically by antenna 106. The mobile application receives the signal, and can optionally determine a signal strength (e.g., −72 dB) along with the beacon signal. When the mobile credential data payload 164 is being presented, the mobile application on mobile device 160A, B can also provide the beacon signal response information as an additional data set. Where the beacon signal response information includes a signal strength, the signal strength may be required by physical access controller device 102 to be greater than a particular threshold signal strength (e.g., −80 dB) before accepting that the mobile device is actually proximate to the beacon.

In a variant embodiment, multiple antennas from different controller devices can also provide beacon signals that are provided by the mobile application. There are different variations possible—for example, if an access control gate is within the proximity of multiple antennas, the antennas and corresponding signals can be used to establish specific conditions for signal strength from each of the beacons. For example, if attempting to access the server room door, which is within the signal range of two other doors, the signal response provided by the mobile device 160A, B, may have logical conditions provided such that it is greatest for the beacon source nearest to the server room door, but between a ranged threshold for the other two doors.

Accordingly, if a malicious user is falsifying a signal, it is more difficult to falsify multiple signals from different sources. Furthermore, falsifying a signal at one door for use at another, if different beacon codes are used in the signalling at each of the doors, would not be effective as a relay attack. A threshold range for non-immediately proximate antennas may be useful as there may be objects in the way of the signal propagation pathway, or the spectral characteristics may vary due to other environmental differences (e.g., arrangement of furniture, air pressure, presence of humans/other objects).

In some embodiments, the mobile credential data payload 164 is dynamically modified to incorporate the beacon response information such that a coordinated package is presented to the access control management system 108.

Figure 2:
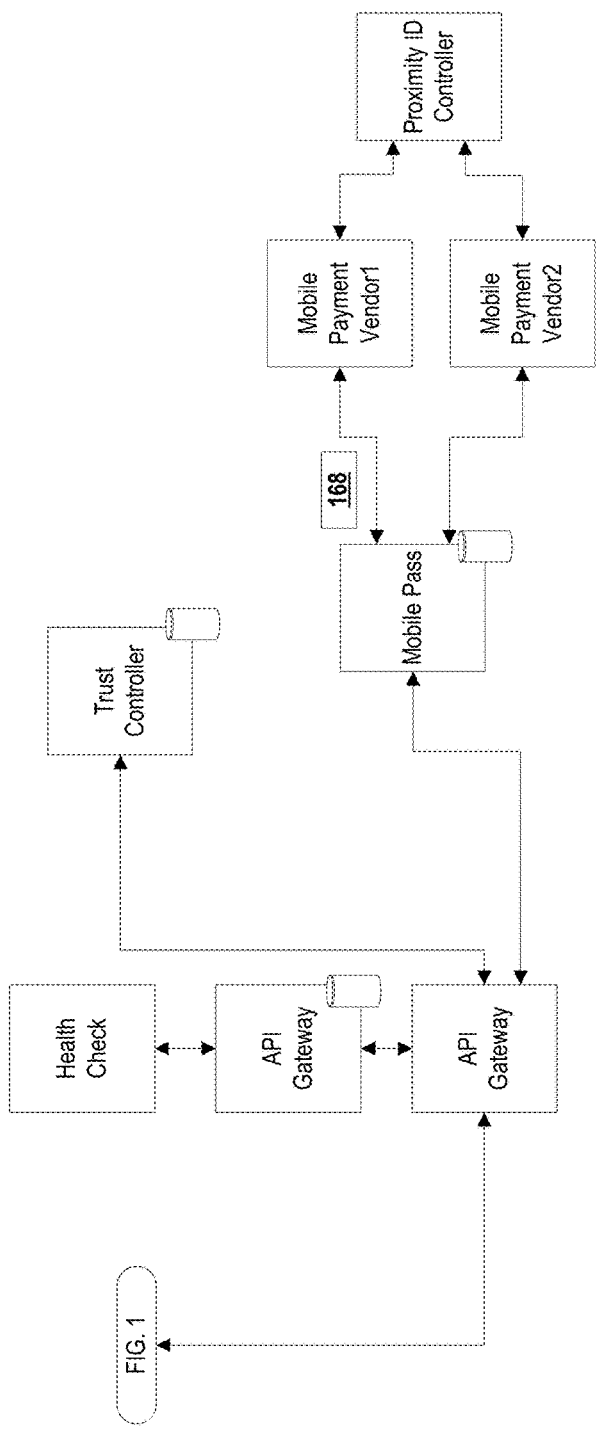
FIG. 2 is a block schematic of an example payment infrastructure that can be utilized in combination with an authentication backend to process tokenized transactions, according to some embodiments.

FIG. 2 is a block schematic of an example payment infrastructure that can be utilized in combination with an authentication backend to process tokenized transactions, according to some embodiments.

An example mobile credential data payload 164 is a data set representative of a digital passcard, which may include, for example, workplace based identifiers, photos, or other identifying data, tied to the identity of the user.

This mobile credential data payload 164 is stored thereon and can be used to interact with existing wireless transaction systems that exist on the mobile device, including near-field-communication based approaches where a tokenized representation of the mobile credential data payload is transmitted across payment communication rails to authorize a financial transaction. Accordingly, existing payment rails can be utilized.

The tokenized version 166 of the mobile credential data payload 164 (tokenized data packet) can be cross-validated with the beacon response from the mobile device 160, among other factors, for validation to determine whether access should be provisioned.

The tokenized data packet 166 can emulate the contactless payment transaction such that a zero dollar transaction is processed, or in some embodiments, a transaction value is also associated with the access provisioning attempt (or successful access provisioning), which can be useful in implementations such as cruise ship access cards or theme park access devices (such as wristbands). A second data packet 168 can be received by the system across a communication network indicating the identity associated with the user.

Access can be provisioned through the generation of control signals 192 which are adapted the actuate locking mechanisms, lift gates, unlock magnetic locks, etc. Where the device is coupled as a retrofit to an existing legacy access control system, the device may further generate signals 192A adapted to emulate commands for interoperation with the existing legacy access control system, and the legacy access control system, upon successful validation, can cause generation of control signals 192.

In an aspect, a dual-custody type access requirement is imposed whereby two mobile devices 160A and 160B are required to provide authentication using both near-field-communication and beacon validation, among others, before the system 100 provides access to protected resources.

In an aspect, determining that the identity is authorized to access the one or more controlled resources includes conducting a limited query only against a plurality of identities each associated with a corresponding mobile device having a relative position characteristic within a pre-defined distance from the low energy proximity beacon signal.

This approach enables a reduced search space, and the identity information for validation may be primed for ease of access, for example, through pre-loading in a faster cache at a validation device and pulled automatically from a directory service. This embodiment is particularly useful for high-traffic volume implementations (e.g., a subway) or where a large amount of data is required for validation (e.g., an extremely high security door requiring over ten elements for validation).

In an aspect, the system is adapted for tracking a plurality of relative position characteristics, each corresponding to a mobile device of a plurality of mobile devices proximate a source of the low energy proximity beacon signal. Upon provisioning access to the one or more controlled resources, the system determines from the relative position characteristics which mobile devices entered an area associated with the one or more controlled resources (or other information, such as video-based human presence tracking systems). The system is configured to determine that a mobile device associated with an identity that was not validated for access to the one or more controlled resources has entered an area associated with the one or more controlled resources, and an alarm can be triggered.

A number of people in a room may be counted or a number of people crossing a particular threshold and mapped against a number of validated users such that if there is a discrepancy, an alarm state may be triggered.

In an aspect, in addition to the beacon signals, sensors on the mobile devices, including GPS, gyroscopes, accelerometers, heartbeat sensors, etc., are utilized to correlate aspects of the user's identity, such as gait, how a device is being held, whether a device is in a pocket, etc. In a further aspect, the additional sensory information may be used for passive step up authentication where security levels have been increased or a higher level of security is required for a particular controlled resource (e.g., a level 6 door, which authenticates via gait as well as near-field-communication, GPS, and beacon).

In a further aspect, the signal strength increase and decrease relative to the beacon position is correlated against the GPS coordinates and/or signal strength of other known transmitters (e.g., WiFi, cellular towers) to add an additional level of spoof protection against simply reading beacon signal strengths.

In an aspect, information extracted from the mobile device is used for passive step up authentication, such as a most played song, a list of installed applications, accessibility settings, nearby WiFi signals, carrier name, IMEI, IMSI, photo album names, stored certificates, etc.

In an aspect, the system may be utilized to require step up of a selected subset of users—for example, in a muster call in a fire drill, the user who is the responsible fire warden may be required to provide additional authentication.

In an aspect, the system may track a number of authorized users in a protected area and corresponding step up or step down authentication of additional users that seek access—for example, there may be a rule that if anyone is alone in a data center, the access requirements are automatically increased such that only high level administrators are allowed to be alone in the data center.

In an aspect, the beacon signal can be coupled with a broadcasted message, for example, indicating that a particular change in security settings has been established and a higher level of step up is now required.

In a further aspect, where a heightened security setting is in effect, a user, while in range of the beacon signal, may be able to conduct a step up additional authentication that is applicable for a pre-defined duration of time (e.g., additional security settings input that are valid for 30 minutes to establish a higher level of trust).

Situations which require a higher level of trust, for example, include where there is a "Level 7 door" which not only requires near-field and beacon validation, but also the provisioning of a password and a retinal scan. When a beacon signal is received, the beacon signal could indicate that this is a Level 7 door now (there was an attempted breach, so all prior Level 5 doors are elevated to Level 7 doors), and the password and the retinal scan could be conducted ahead of time on the mobile application, and only valid for the pre-defined duration of time.

Aspects described herein are applicable to various implementations relating to physical or virtual access control using digital access control credentials. The physical system may be retrofit into any existing access control management system and adapted for interoperation through signal emulation or designation of accounts that are specifically associated with the improved security system. The system may, in some embodiments, interoperate with an overall security controller which may interoperate with a directory system that, for example, is a certificate server that maintains security levels for various users in an organization.

The system may also be utilized in relation to organizations which have members of the public interfacing with their systems, such as controlling access to amusements and attractions at theme parks. Other implementations include physical access control in facilities having varying levels of security, such as military facilities, prisons, homes, workplaces, factories, etc.

Figure 3:
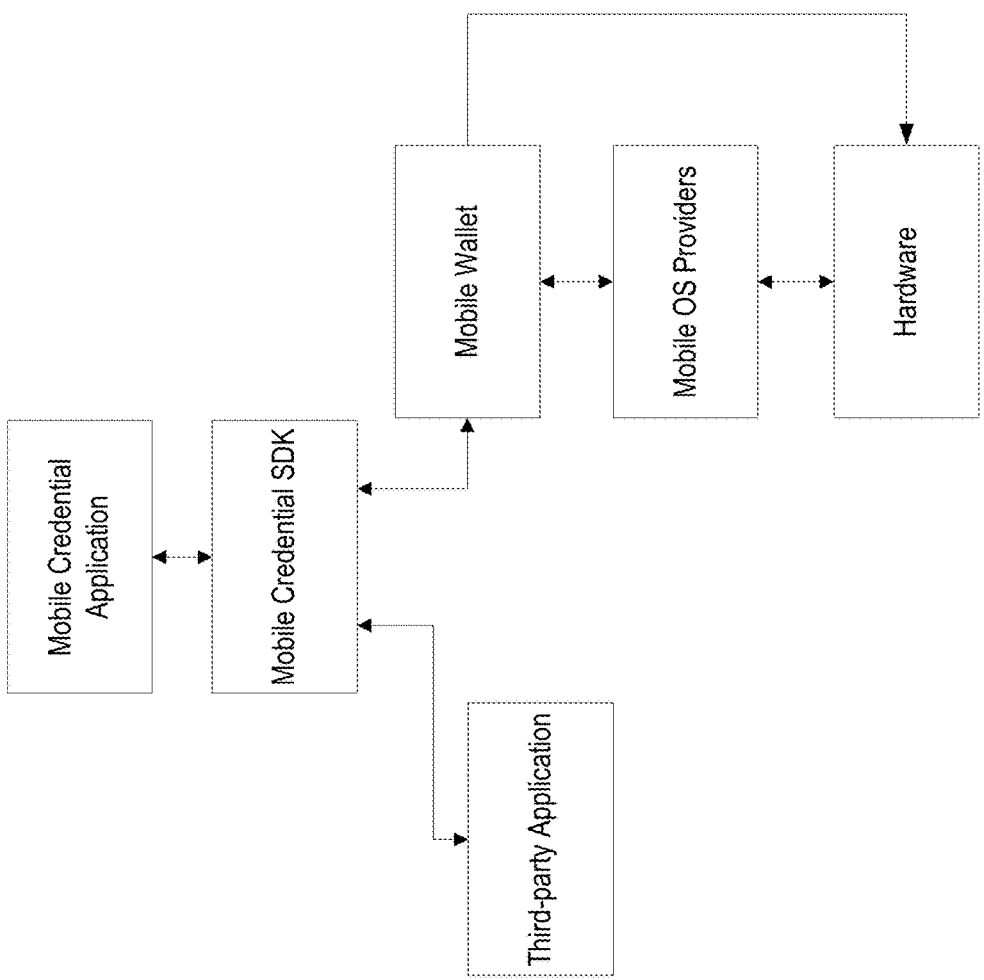
FIG. 3 is an example block diagram of logical components residing on the mobile device, according to some embodiments.

FIG. 3 is an example block diagram 300 of example logical components residing on the mobile device, according to some embodiments.

The mobile credential application is an aspect in which the user interacts with and experiences, for example, through a mobile wallet stored on the device, an application for communicating with a backend network a series of data packets for confirming identity or characteristics of the device that can be used for confirming identity.

The mobile credential application can include a component for translating received beacon signals to obtain beacon signal strength, identifier, or other data packets transmitted one-way from the beacon source. The application provides a user interface on top of the mobile credential SDK, this SDK is used to interact with the mobile wallet provided, for example, by a mobile device provider or operating system. The mobile wallet can be used to interact with backend services, which include necessary infrastructure to allow for updating the mobile credentials which are stored within the mobile wallet through push notifications or other Web services.

The device hardware can use multiple forms of data transmission, for example, in an embodiment, near field communication and Bluetooth low energy. These components are used together to transmit the data from the mobile wallet and to an access controller device through a network for validation.

Figure 4:
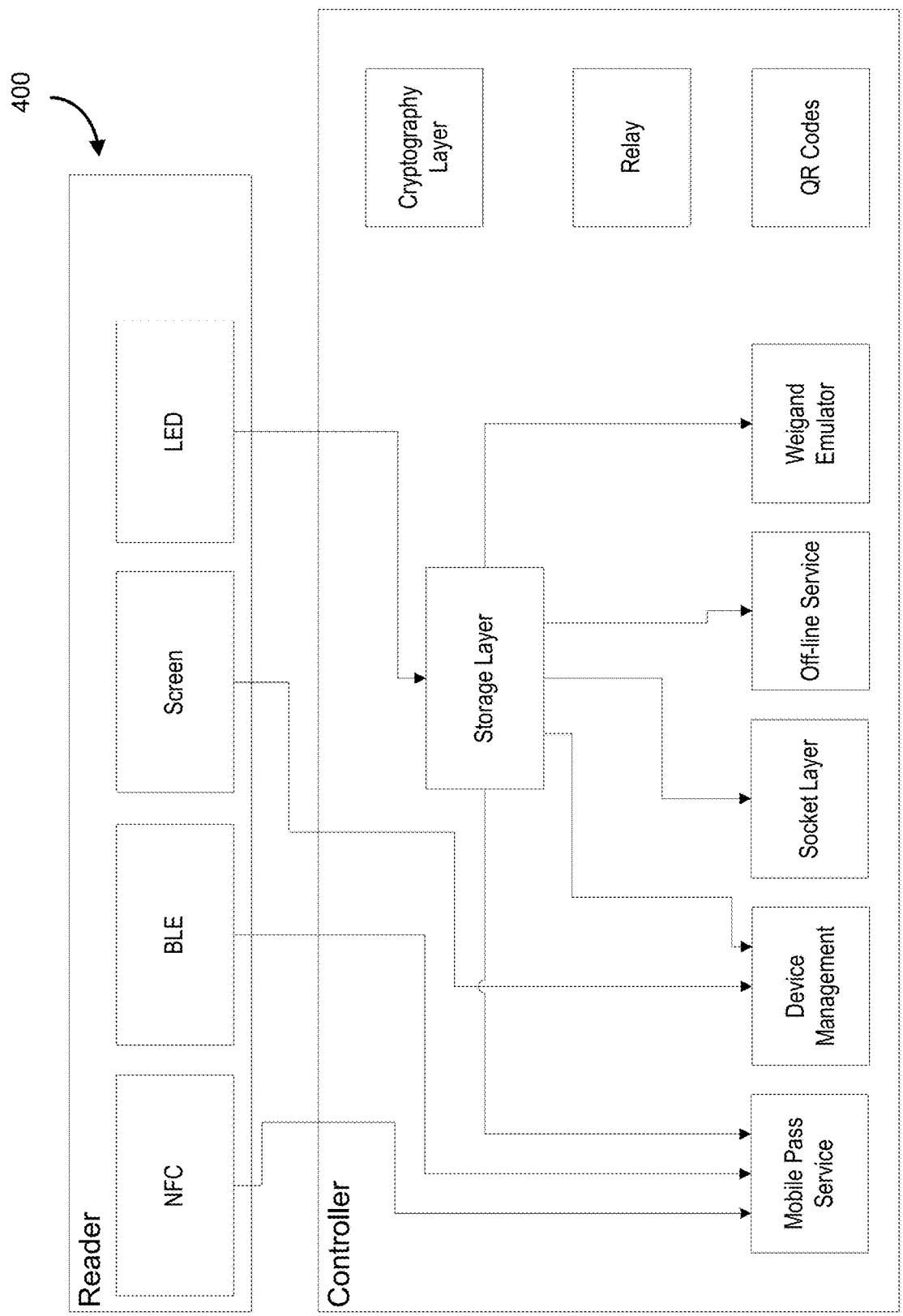
FIG. 4 is an example reader and controller block diagram showing components maintained on the controller and the reader, according to some embodiments.

FIG. 4 is an example reader and controller block diagram 400 showing components maintained on the controller and the reader, according to some embodiments.

Multiple services are operated within the controller (e.g., Raspberry Pi 3™ or Pi Zero W™) to interface with the mobile credentials that are transmitted to the controller device via the near-field communication antenna. The reader is the encapsulation of multiple antennas but not the controller hardware, this is located within the controller casing, in accordance with some embodiments.

The near-field communication antenna within the reader sends the mobile credential encrypted payload data to the controller which then processes the data as a token, similar to how payment systems operate, and this is processed within the mobile pass service on the controller.

The mobile pass service invokes the storage layer to store the transactional data, and to also invoke the additional services on the device. For example in the case that the system is offline, the decryption of the payload data that is within the mobile credential is done by the offline service.

The device management interface is used to allow the rest of the infrastructure to manage the individual controllers, this includes a user interface that is based off a SPA (Single Page Application) architecture, and backed by a locally hosted and running API. The socket layer service is used for real-time communication of events and synchronization of data between the local controller and the rest of the infrastructure.

Finally with the Wiegand™ emulator, the system is adapted to support both Wiegand™ data in flows and out flows, allowing the retrofit of current door reader hardware. Once the decrypted payload is received, it is then sent through to the storage layer which will look up the user associated with the decrypted token, and then follow through with transmission of the access control manufacturer's card number that is associated with that specific user, in an example embodiment.

Figure 5:
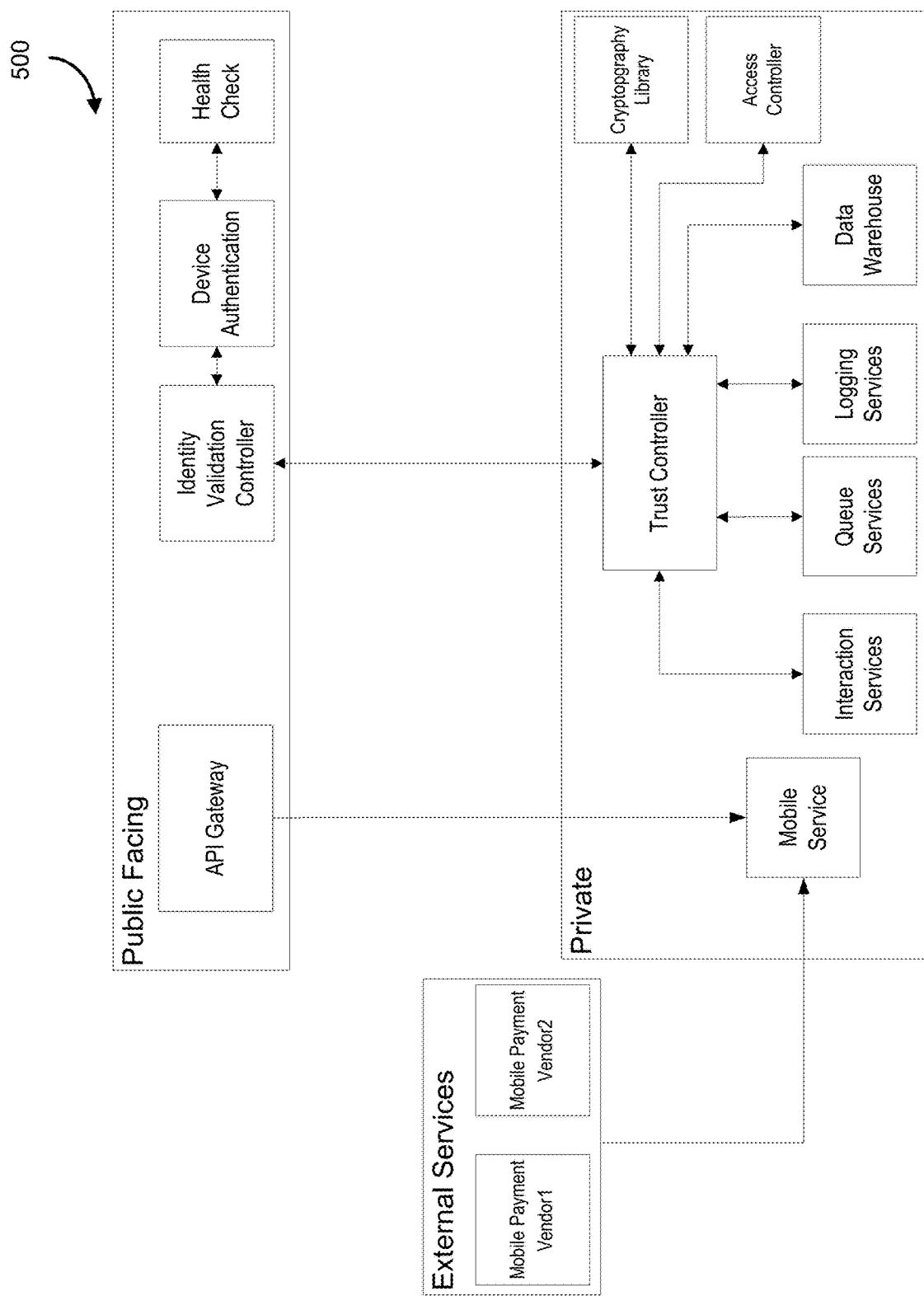
FIG. 5 is an example backend infrastructure block diagram, according to some embodiments.

FIG. 5 is an example backend infrastructure block diagram 500, according to some embodiments. The backend infrastructure is shown having a public facing component, a set of private services, and coupled to external services.

The backend infrastructure, in some embodiments, includes a trust controller that manages multiple public-facing reader devices that are each coupled to an access controlled area or access control mechanism, such as a door, a cabinet, a digital access controller (e.g., controlling login/log out of an operating system).

The trust controller is a backend device that can dynamically modify security levels and aspects in modifying trust requirements for the various reader devices under its ambit.

The trust controller, in some embodiments, may interoperate with a directory service and/or certificate management mechanisms to modify security levels based on a role of the individual, for example. The trust controller may incorporate rules for modifying security levels, such as based on time of day, a number of prior access attempts, a number of current users in an area or using a resource, etc.

Figure 6:
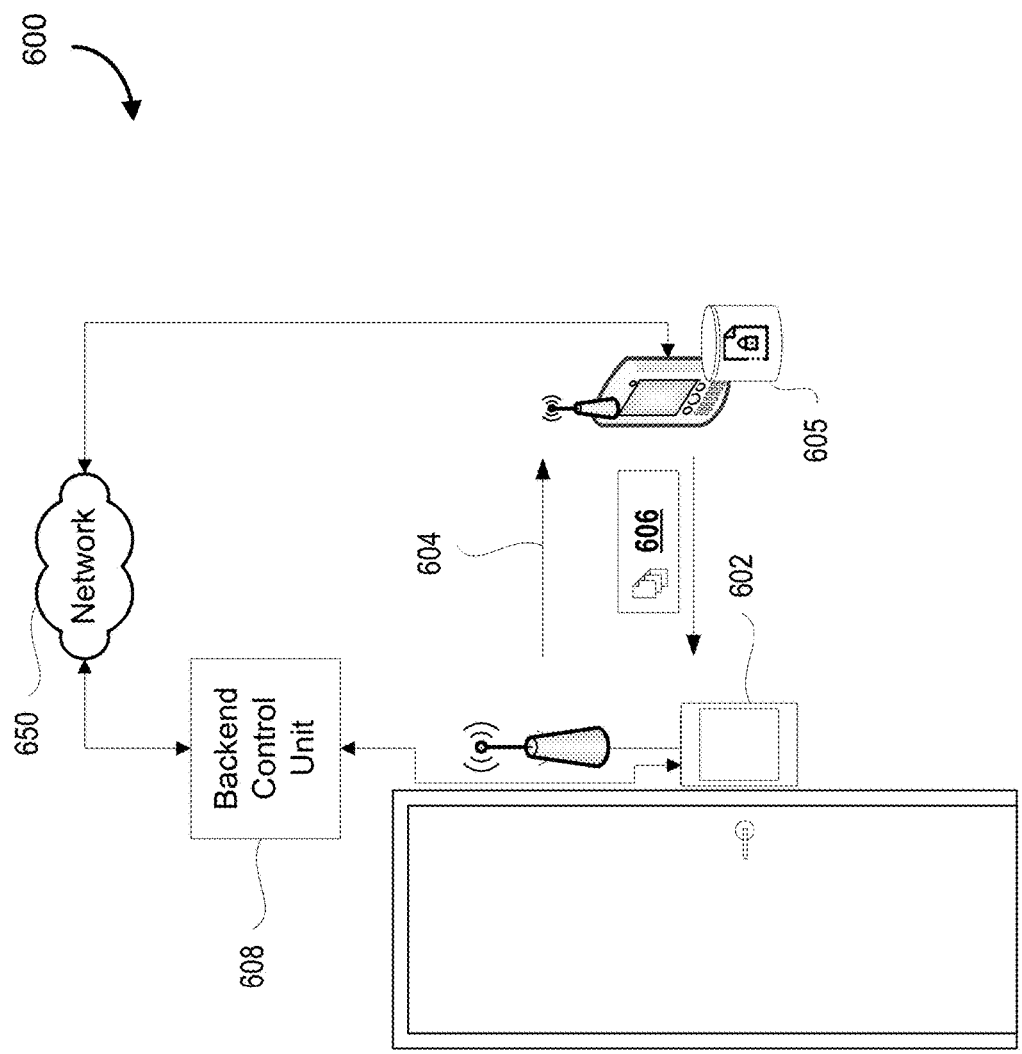
FIG. 6 is an example depiction of an access managed secure resource, according to some embodiments.

FIG. 6 is an example depiction 600 of an access managed secure resource, according to some embodiments.

In this illustration, an example secure door is shown. A panel 602 can be coupled onto the secure door having a backend controller. The panel 602 can include a low energy proximity beacon antenna as well as a near-field communication signal receiver.

When a user is in range of the beacon, the user's device receives the one-way beacon signal 604, and the device returns a signal through network 650 indicating that the user is proximate to the door and the strength of the signal thereof.

If multiple users approach a door, the backend control unit 608 may be able to determine that the users' devices are approaching through monitoring the signal strength (e.g., signal gets stronger as users approach the door). In an embodiment, the backend control unit 608 pre-fetches identity validation data associated only with the users approaching the door and stores them in a memory, such as a quick access cache memory.

When the user or users approach the door, the users validate their credentials through, for example, opening up a mobile wallet on their devices and causing a one-time credential to be generated based on a stored identity payload resident, for example, on a secure enclave on the mobile device.

Other credentials may also be provided, for example, additional biometric validation (e.g., human fingerprints, gait, retinal scans, gyroscopic readings, accelerometer readings, device fingerprint validation), where the door has a higher level of security or validation required.

On validation, the door lock can be temporarily deactivated to allow access to the controlled area behind the door. Where the system 100 interoperates an existing access control management system (e.g., in a retrofit situation), the system 100 may generate emulated access signals which are used to control activation/deactivation of locks, etc.

In some embodiments, the backend control unit 608 is further configured to attempt to assess whether the users have cross a threshold through, for example, comparing GPS coordinates on the mobile devices, tracking the signal strength of the beacon, comparing signals returned in view of other beacons (e.g., for triangulation), etc.

Figure 7:
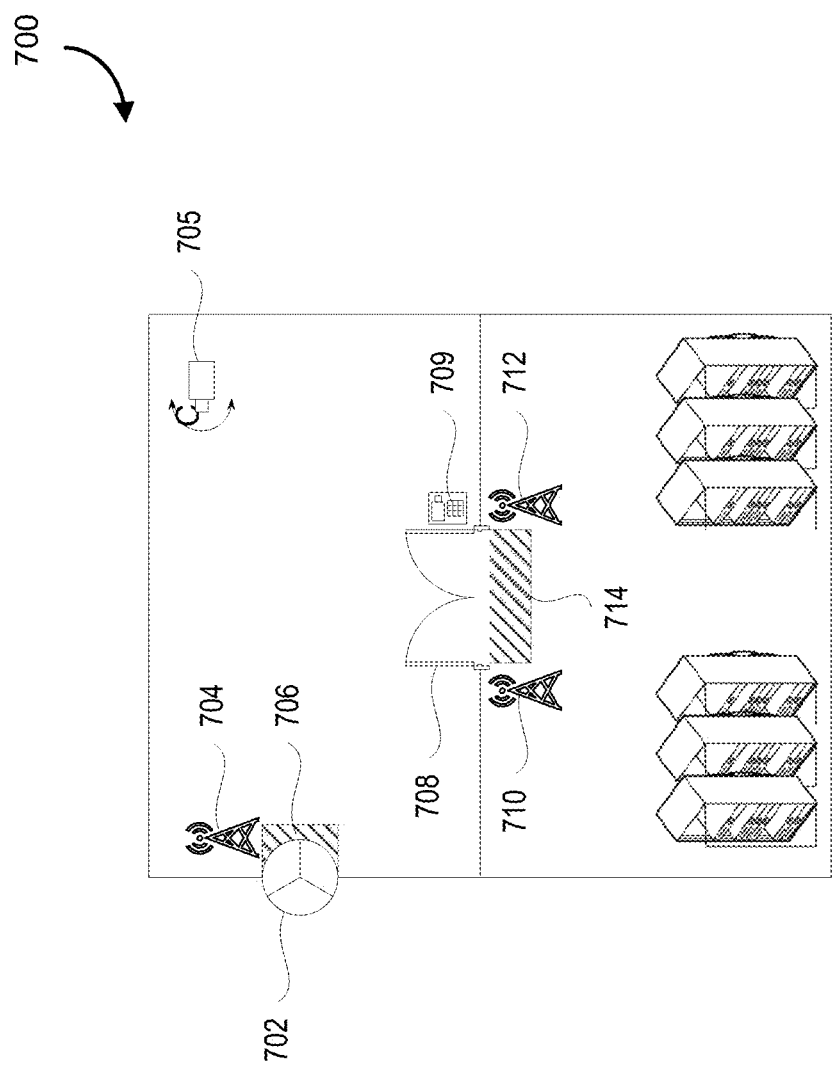
FIG. 7 is an example depiction of an access managed facility, according to some embodiments.

FIG. 7 is an example depiction of an access managed facility, according to some embodiments.

This facility 700 includes a revolving door/mantrap 702, which only allows a single user to enter at a given time. A first control mechanism 704 described in various embodiments may be provided, which includes at least one proximity beacon.

A threshold area 706 may be tracked, for example, by video camera 705 or triangulated location based on multiple beacon signals to ensure that the authorized users (e.g., to track a fire warden designated user) have entered or only the authorized users have entered (e.g., to keep out unauthorized users).

An increased security section, for example, having data stored on secured servers may be secured by door 708. The door 708 relative to the revolving door 702 may have a higher level of security (e.g., Level 5 as compared to Level 1), and additional validation steps may be taken before access is provisioned through door 708. In an example of increased security, the door 708 may be secured with controllers having multiple beacons 710 and 712, which may be established behind the secure door to reduce an ability for tampering. The use of multiple beacons may allow improved signal triangulation. An access panel 709 may be provided so that the user is able to provide the digital credentials stored in a digital wallet.

An amount of additional validation may vary, for example, based on a number of users who are already in the higher security area, a time of day, an identity/role of the user, among others, and similarly, threshold area 714 may be tracked to validate whether users have entered after validation, or whether unauthorized users have entered after validation.

Figure 8:
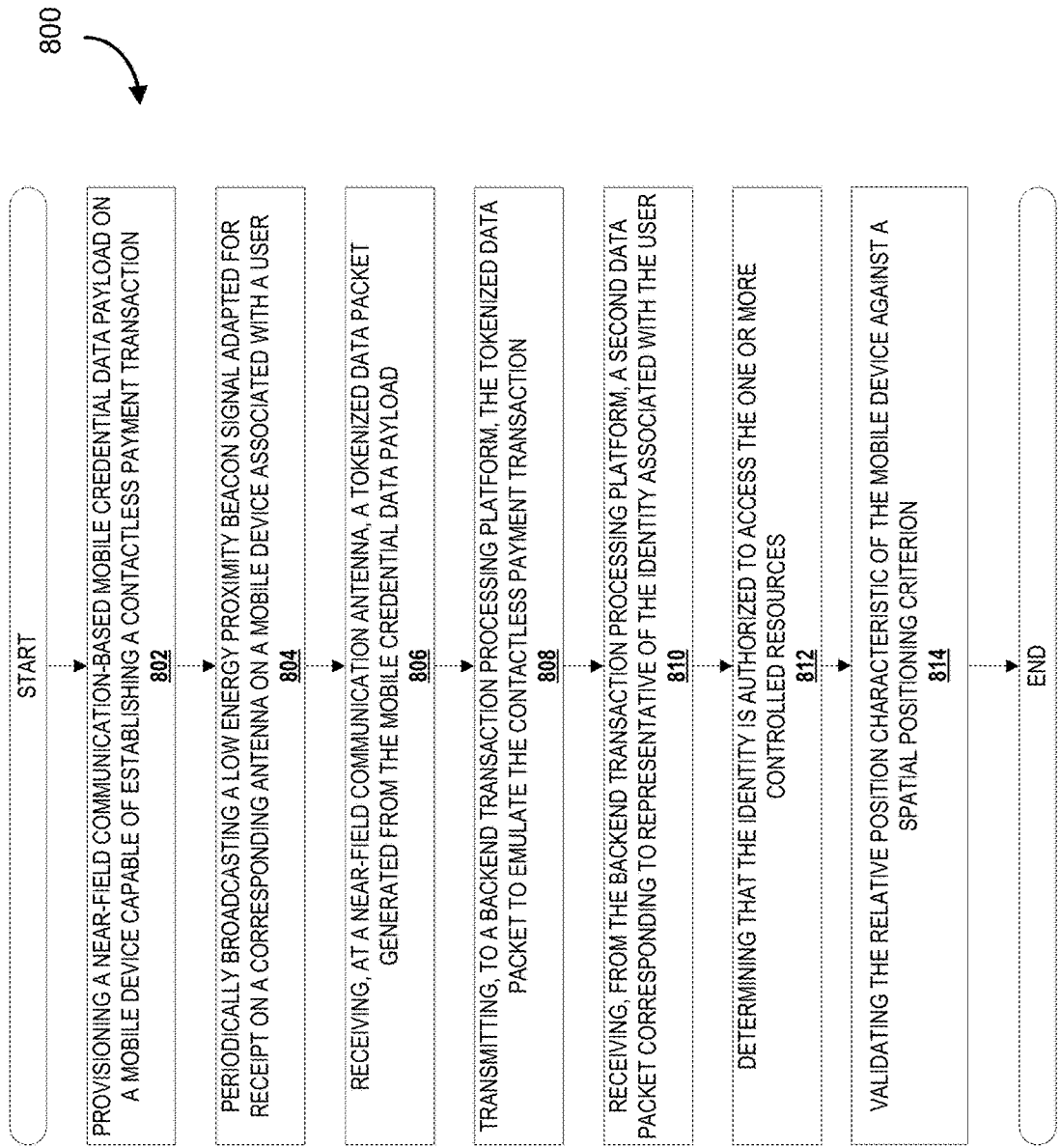
FIG. 8 is a method diagram illustrating example steps of a process for establishing secured communications for access control, according to some embodiments.

FIG. 8 is a method diagram illustrating example steps of a process for establishing secured communications for access control, according to some embodiments.

At 802, a payload provisioning mechanism provisions a near-field communication-based mobile credential data payload on a mobile device capable of establishing a contactless payment transaction, the near-field communication-based mobile credential data payload representative of an identity associated with the user.

At 804, an access control device periodically broadcasts or controls broadcasting of a low energy proximity beacon signal adapted for receipt on a corresponding antenna on a mobile device associated with a user, the mobile device, upon receiving the beacon signal, transmitting a data packet indicative of a relative position characteristic of the mobile device.

At 806, at a near-field communication antenna coupled to the access control device, a tokenized data packet is received that is generated from the mobile credential data payload having a one-time use security code unique to a corresponding authentication action performed on the mobile device by the user.

At 808, the tokenized data packet emulating a contactless payment transaction is transmitted to a backend transaction processing platform.

At 810, the backend transaction processing platform provides a second data packet corresponding to representative of the identity associated with the user based on the emulated contactless payment transaction.

At 812, the identity is compared against authorized identities to establish that the user is authorized to access the one or more controlled resources.

At 814, the low energy beacon proximity signal response is used to establish relative position characteristic of the mobile device, and if this validation step is passed, access is provided to the one or more controlled resources.

Figure 9:
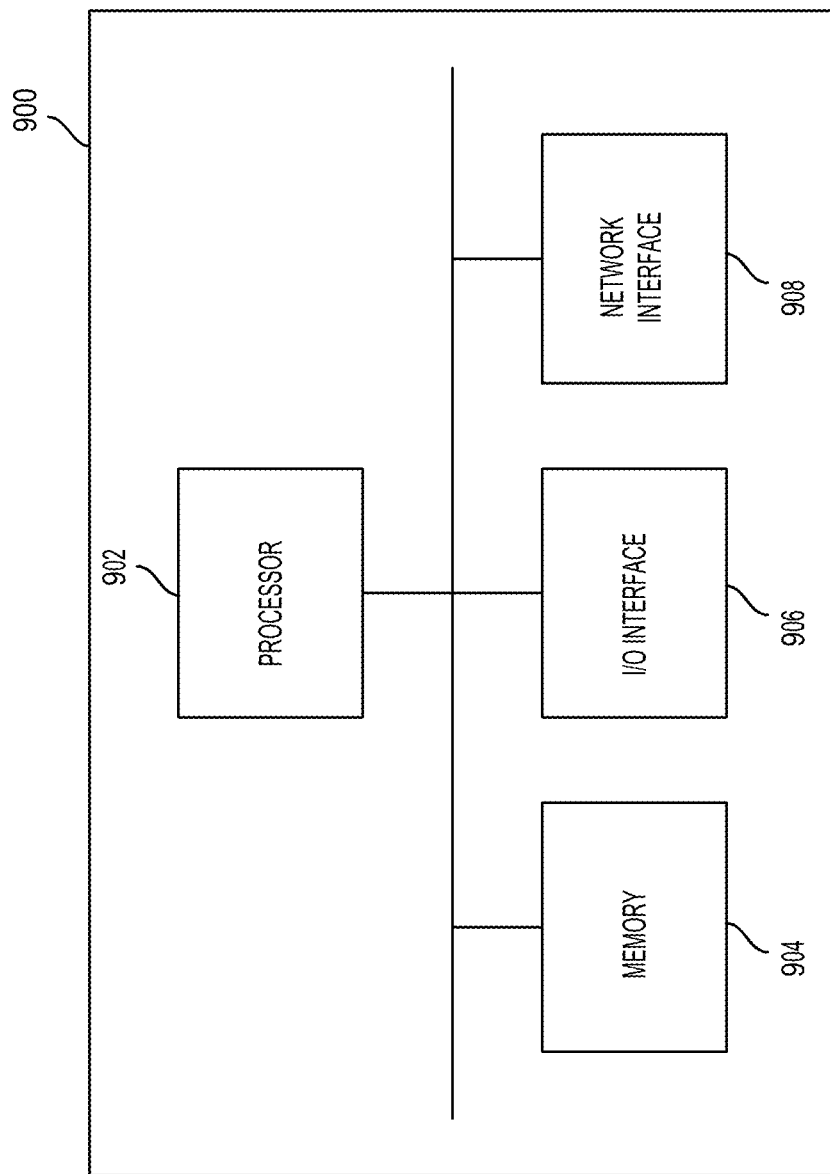
FIG. 9 is an example diagram of an example computing system, according to some embodiments.

FIG. 9 is a schematic diagram of a computing device 900 such as a server. As depicted, the computing device includes at least one processor 902, memory 909, at least one I/O interface 906, and at least one network interface 908.

Processor 902 may be an Intel™ or AMD™ x86 or x64, PowerPC™, ARM™ processor, or the like. Memory 904 may include a combination of computer memory that is located either internally or externally such as, for example, random-access memory (RAM), read-only memory (ROM), compact disc read-only memory (CDROM).

Each I/O interface 906 enables computing device 900 to interconnect with one or more input devices, such as a keyboard, mouse, camera, touch screen and a microphone, or with one or more output devices such as a display screen and a speaker.

Each network interface 908 enables computing device 900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Computing device 900 is operable to register and authenticate users (using a login, unique identifier, and password for example) prior to providing access to locations, applications, a local network, network resources, other networks and network security devices. Computing devices 900 may serve one user or multiple users.

Figure 10:
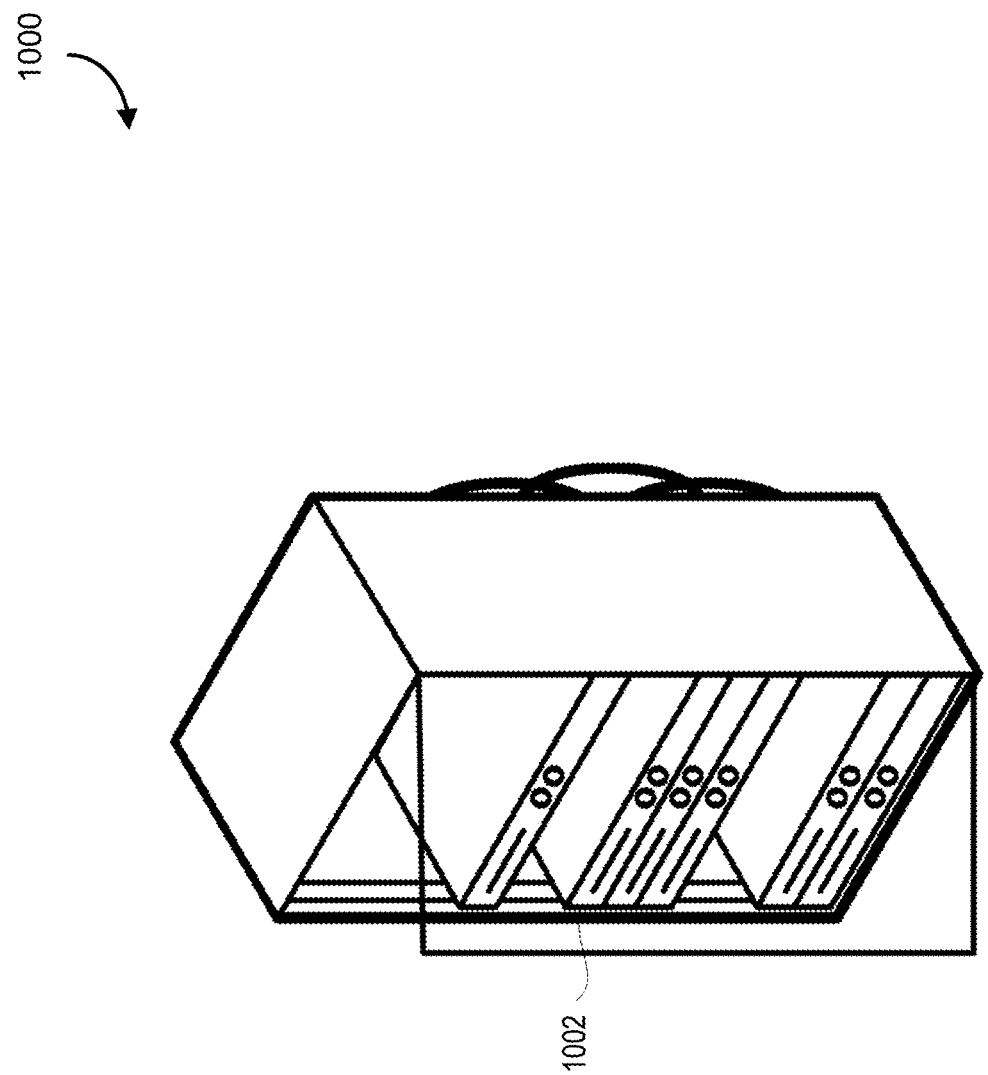
FIG. 10 is a diagram of an example special purpose machine, according to some embodiments.

FIG. 10 is an illustration of a special purpose machine 1002, according to some embodiments that may reside at a data center. The special purpose machine 1002, for example, incorporates the features of the system 100 and is provided in a portable computing mechanism that, for example, may be placed into a data center as a rack server or rack server component that interoperates and interconnects with other devices, for example, across a network or a message bus.

The special purpose machine 1002, in some embodiments, is an identity validation circuit that interoperates and controls operation of one or more access control circuits in accordance with the system 100. For example, the special purpose machine 1002 may be a controller that receives signals across the message bus or the network to coordinate security levels and to receive validations and signals thereof from other computing components. Where a breach or unusual activity is tracked at one location, security levels may be dynamically varied, etc.

Figure 11:
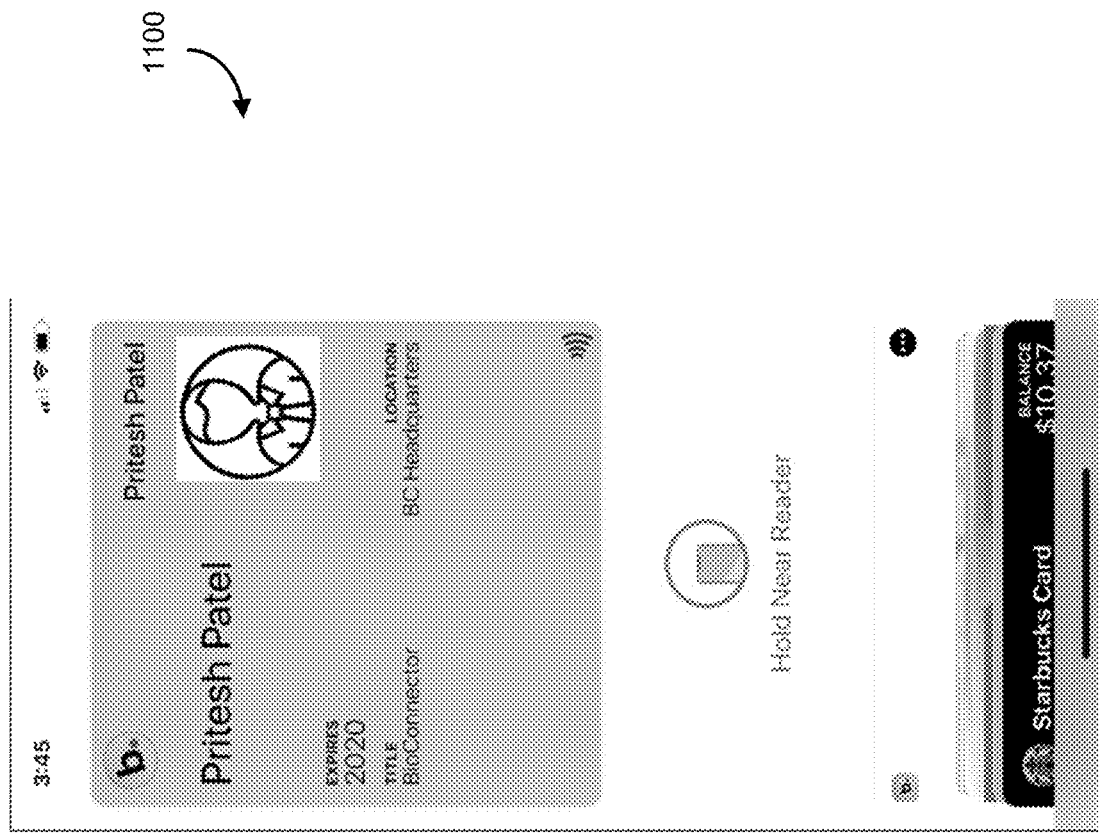
FIG. 11 is an example screen rendering of a mobile credential, according to some embodiments.

FIG. 11 is an example screen 1100 rendering of a mobile credential, according to some embodiments. FIG. 11 is extracted from a working prototype that was built for internal technology validation purposes. As shown in FIG. 11, the credential can expose certain information to the user on the display interface of the device—the user's name, a photograph, an expiry date, a title, a location, among others.

However, the credential can include much more data that is not visible (e.g., device type, biometric information, a challenge passphrase "292903fa88", a decryption key for decoding encrypted beacon messages, accelerometer/GPS/nearby WiFi network information), which is encapsulated in the mobile credential payload. The mechanism for bringing up the credential can further request additional validation information before it is provisioned, such as requiring a facial biometric, the input of the passphrase "292903fa88", a fingerprint, etc.

Figure 12:
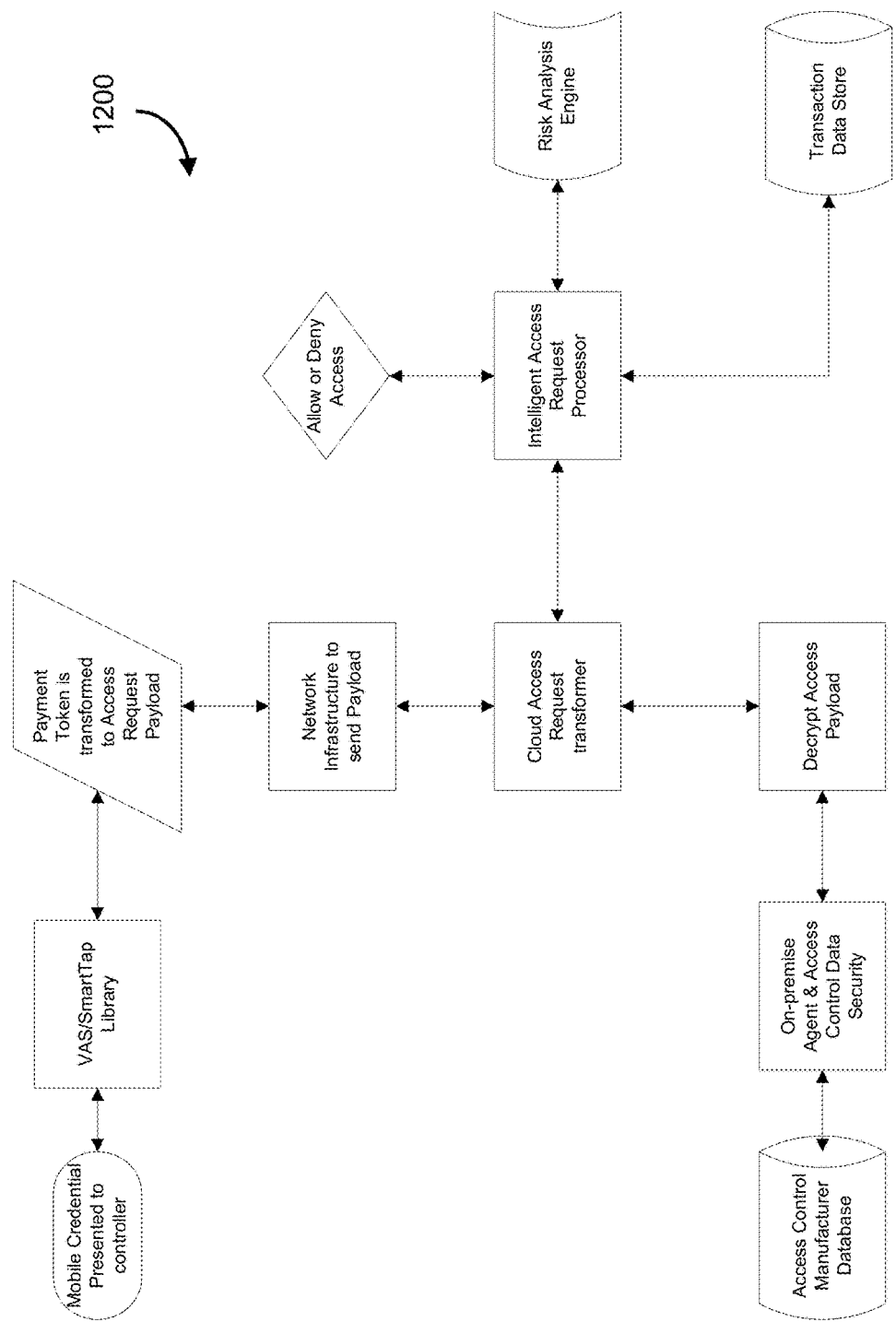
FIG. 12 is an example process flow diagram, according to some embodiments.

FIG. 12 is a data flow diagram 1200 descriptive of an example process including data transformations that occur in relation to communicating a payload to an on premises access control management system on premise. In this example, there may be additional processes, such as risk analysis engines, transaction data storage mechanisms, among others.

Implementation Examples

The following non-limiting examples are provided for illustration purposes.

In a first example, the facility is a hospital having a data center, having several secure doors.

There are 50 individuals who have access to the facility, at different security levels. The front door, where everyone enters, is a first secure door. There is a second door 5 m away which leads to a supply closet having pharmaceutical drugs which require security. There is a third door 10 m away from the front door and 5 m away from the second door which is used for housing the data center of the facility.

Each of these secure doors is protected by system 100, and there are multiple physical access controller devices 102 that are coupled to each secured door. System 100 includes an identity controller which manages the overall security for the facility.

Each of the individuals has a mobile device 160, storing credential payloads 164. In this simplified example, three of the individuals approach the first door. Their devices 160 couple to various beacons 106, and the mobile applications on each mobile device 160 track the signal strength from each of the beacons 106.

As the mobile devices themselves can relay information relating to who is in proximity to the door, in some embodiments, a reduced search space is utilized by the system 100 by polling mobile applications to identify those users within close proximity of a particular beacon and only conducting matching of profiles/accounts to the credentials of those users (e.g., only those having a >−10 dB signal from door 1's beacon). A reduced search space can be used first, and if that fails, in some embodiments, an expanded search space can then be utilized (e.g., against M employees proximate to the door, if that fails, then against N employees who are on the day shift, if that fails, then against O employees which includes all of the employees).

|  | Door 1's Beacon | Door 2's Beacon | Door 3's Beacon |
| --- | --- | --- | --- |
| Individual 1 | −3 dBm | −10 dBm | −15 dBm |
| Individual 2 | −6 dBm | −11.2 dBm | −14.5 dBm |
| Individual 3 | −5.5 dBm | −13.8 dBm | −15.6 dBm |

Each of the beacons can broadcast identifiers such that the beacon's source can be identified or rolling codes can be utilized to increase a security level.

| Beacon 1 (5 minute rolling code) | Beacon 2 (5 minute rolling code) | Beacon 3 (30 s rolling code) |
| --- | --- | --- |
| Code: 24f7ca5f6ff1a5afb9032aa5e533ad95 Encoded message: Beacon1_2019-11-AB28FF_Level_1 | Code: 81566e986cf8cc685a05ac5b634af7f8 Encoded message: Beacon2_2019-11-FF2EA_Level_2 | Code: b7827ac08e1eaeec4a7db6b6dd0c249a Encoded message: Beacon3_2019-11-AAB241_Level_7 |

Based on the beacon signal strength information and/or rolling codes, the system 100 can conduct additional verification, for example, based on a number of people who will be passing through the door once it has been opened, etc. The beacon signal strength from the other doors can be compared with an acceptable range such that the positions of the users can be triangulated or otherwise established using multiple beacons (e.g., door 2 and door 3 in this example) to add further confirmation that these users are actually at these locations.

The beacons themselves can include encoded messages stored therein that need a specific key to decrypt. The mobile device 160 may include an application that maintains this decryption key, and in some embodiments, the decrypted message can also include the level of security and/or other information about the door/beacon.

The code associated with Beacon 1 can, for example, indicate a lower security door, while Beacon 3 may indicate a higher security door, where the user has to include a fingerprint authentication for encapsulation into the mobile credential 164. The higher security door, for example, is the server room housing sensitive patient data, which the hospital wishes to implement a very tight security protocol for data protection.

The first individual takes her smartphone out of her pocket, calls up her mobile credential 164 on her mobile wallet. She then puts the mobile credential 164 on a reader coupled to the door, which initiates a NFC transaction. The mobile application on her device 160, in parallel, encapsulates the beacon messaging in a data message.

The encapsulated messaging may include the mobile device 160 decrypting the beacon message, and in some embodiments, using its own public key or other encryption key to re-encrypt the beacon message for encapsulation (e.g., 24f7ca5f6ff1a5afb9032aa5e533ad95->Beacon1_2019-11-AB28FF_Level_1_-3 dBm->b199649bb776259706b3f87f53405b61). Re-encrypting the message allows for an increased level of security to avoid potential eavesdropping attacks. The re-encrypted message, for example, can include also the beacon strength information.

In some embodiments, the mobile credential 164 may require additional verification to be encapsulated, such as a facial recognition-based authentication message, a fingerprint, a retinal scan, a password to be entered at time of calling up the mobile credential 164, among others (e.g., the message can be appended with a hash "775adc8545f3f6f878f267d8f017cadc" based on the "step up" additional information requested at time of invoking the mobile credential).

In an embodiment, the data message having the beacon messaging is transmitted to the access control management system 108 separately from the NFC transaction (e.g., over WiFi, Bluetooth, or cellular networks). A benefit of this approach is that it is harder to spoof by a malicious user as two different communication pathways can be utilized.

In another embodiment, the data message having the beacon messaging is combined with the NFC transaction such that the NFC transaction is utilized to transmit information stored on the mobile credential payload 164 (e.g., an encrypted message based on a card #, a facility #, a user #) and the beacon messaging together. For example, the encrypted message may include that the user's identity is active directory profile for "John Smith, IT hard server room support night technician, Infrastructure Team, from the Irish office".

A benefit of this approach is that only one communication pathway needs to be utilized, and may work despite WiFi, or cellular networks not being available. However, there may be increased vulnerability as a result of both being sent across the same communication mechanism.

The NFC transaction can be a transaction over the value added services protocol, providing a zero dollar transaction but having the payload 164 adapted to convey additional information in the payload 164, and in some embodiments, the beacon signal strength information and/or encoded messages from the beacons.

The access control management system 108 can then validate and verify that the user is indeed allowed to have access to the secured resource (which can be different from door to door). Payload data being sent can be contemplated as a payment token, having various identifiers and/or random bits included to provide nonce-type additional security.

During the decryption of the payload 164, messages inside can be decoded and validated against a set of authentication information stored thereon at the controller 108. The payload being sent allows for improved access control while being protected by payment grade security protocols.

The controller 108 decrypts and decodes the message being sent over the payment protocol, for example, using an encryption key stored thereon, and allows the token to be processed such that the data can be consumed to identify the user and their security credentials, among other information. In further embodiments, the mobile credential payload 164 can include rolling codes and encoding such that, for example, a message that was acceptable two weeks ago is no longer acceptable. Different periods for rolling codes can be implemented. There may be multiple layers of credentials, which allow for different access types (e.g., some credentials may require dual custody-type access, some may have time of day restrictions [cleaners, night staff]). There may be embedded security levels, indicating that the individual has a level one/level two access, etc.

In the embodiment where the beacon messaging information is sent over a second communication mechanism (e.g., WiFi or cellular), similarly, the second data message may be decoded and processed by the controller 108.

In another embodiment, a static payload 164 is provisioned such that the mobile credential 164 does not need to be periodically updated (e.g., in the event of a systems failure). In another embodiment, both a static payload and a dynamic payload can be provisioned. In another embodiment a previous payload is still stored on the device. If the communication mechanisms for updating the payload 164 are not functional, and for example, the user presents the N−1 credentials (last available credentials) or a static credential, the controller 108 may request from the mobile device 160 additional step up information before allowing access (because old/emergency credentials are being used). In some embodiments, memory on the mobile device can be used to store a series of older credentials (or just the last credential) for backup purposes.

The device can update the payload 164, for example, whenever it is connected to a network or forcibly by launching an application and requesting an update manually.

The access provisioning mechanism 110 is not limited to just mechanical locks (key cabinets, automobile doors), but can include secured virtual resources such as desk station hoteling (e.g., logging into computers, secured printing stations, conference rooms), among others. For example, the access provisioning mechanism 110 can be used to control the actuation of a secured print job being released, for example, or for a vending machine to dispense controlled items, such as substances that would otherwise be prone to abuse (e.g., narcotic-based painkillers).

In this example, upon validating the credentials, the access provisioning mechanism 110 unlocks a door. The beacon signal strengths may be monitored by the application on the mobile device such that a number of individuals considered to have passed the threshold can be tracked, and for a high security door, if more than one individual has passed the door (e.g., "potential tail-gater"), an alarm may be issued. Similarly, the access provisioning mechanism 110 can also determine if anyone actually passed through a door or if it was just unlocked and re-locked again after a threshold period of time has elapsed (e.g., person changed their mind). Other information, such as GPS data, gyroscopic data, accelerometer data, etc. can be used to check if the user did actually pass through a door or other threshold.

An example set of beacon strengths are noted below:

|  | Door 1's Beacon | Door 2's Beacon | Door 3's Beacon |
| --- | --- | --- | --- |
| Individual 1 | −3 dBm | −10 dBm | −15 dBm |
| Individual 1 (after entry, authorized) | −10 dBm | −2 dBm | −12 dBm |
| Individual 2 | −6 dBm | −11.2 dBm | −14.5 dBm |
| Individual 2 (after Individual 1's auth) | −12 dBm | −3 dBm | −11 dBm |
| Individual 3 | −5.5 dBm | −13.8 dBm | −15.6 dBm |
| Individual 3 (after Individual 1's auth) | −11 dBm | −7.5 dBm | −14.5 dBm |

Individual 2 appears to be a tail-gater on Individual 1's entry as vectors generated from the positions of the three beacons (x1, y1), (x2, y2), (x3, y3) against the signal strength (which can considered be a proxy of the distance from the beacon). Tail-gater analysis may be assessed based on a threshold set of ranges to prevent false positives.

In some embodiments, the position of a person can be estimated based on which locks they have opened, etc. This can be useful in the hospital example if, for example, the nurse having specialist respirology credentials last opened the pharmaceutical closet and was not responding to her pager, so that the staff can find her and inform her that a patient is having breathing difficulties.

In another embodiment, the access provisioning mechanism 110 is also coupled to a payment mechanism for dispensing objects such as pharmaceuticals (e.g., controlled painkillers), and instead of a zero dollar transaction taking place, the information sent over NFC also includes payment information and a transaction takes place (e.g., a user is authorized to purchase 3 morphine bottles a month after a surgical intervention). Other types of payment transactions can include office-sharing space, car-sharing, living accommodation sharing platforms, among others.

In these examples, the access provisioning mechanism 110 can be controlled to also trigger downstream workflows tied to the profiles, such as the activating of a timer (e.g., electrician arrived at 11:02 AM, was authorized, and left at 3:06 PM, and a payment should be disbursed for the amount of time worked). The access provisioning mechanism 110 can be used to control solenoids or actuators that unlatch doors, unlock magnetic strips, activate vending machine dispensation, ignition interlocks, among others. Ignition interlocks are particularly useful for fleet management systems or car rental systems. For ignition interlocks, the system 100 can be combined with intoxication sensory devices (e.g., a truck driver prior to starting a shift may be prevented from operating the truck until sufficiently recovered as indicated in a proxy blood alcohol reading, which can be encapsulated into the mobile credential as a threshold requirement).

The access provisioning mechanism 110 can also be tied to profile-based exclusions and control. For example, the system 100 can be used to limit the number of times an individual is able to go to a casino (e.g., a person self-identified as a problem gambler) or the amount of chips this person is able to purchase from the chip dispensation mechanism at the casino (e.g., up to $100/month).

In another embodiment, the payment mechanism rails can also be used for transactions whereby a payment method associated with the NFC transaction, instead of being charged, is given money instead (e.g., personal service workers, dog walkers). Instead of money, credits or other proxy value or tokens can be provided.

In another embodiment, the access control management system 108 is also used to compare access triggers to credentials on file for a particular user associated with the payload provided 164. For example, the user may be seeking access to a warehouse having forklifts or seeking to unlock an ignition lock of a forklift. The access control management system 108 may only provide access to workers having forklift operation credentials. A similar mechanism can be used in a kitchen of a restaurant, where only those with food handler certifications are given access.

The access control management system 108 can be used for vehicle operation control where operators need to have driver's licenses on file, or in more complex situations, where, for example adverse weather conditions are present, the access control management system 108 may require an enhanced level of credentials (e.g., an airplane goes from requiring "visual flight rules" credentials to requiring "instrument flight rules" credentials because the visibility around the airport is poor).

Example Credential Payload

| Table for Payload Data: | |
| --- | --- |
| Bluetooth Proximity Payload | Mobile Wallet Payload |
| id | id |
| uuid | uuid |
| device_config_voipAllowed | cardNumber |
| device_config_carrierName | rawBits |
| device_config_language | facilityCode |
| device_config_countryLangugeDifference | nonce |
| device_config_canMakePayments | userUUID |
| device_config_keyboards/0 | deviceUUID |
| device_config_keyboards/1 | accountUUID |
| device_config_country | |
| device_config_jailbreak | |
| accessibility_closedCaptioning | |
| accessibility_guidedAccess | |
| accessibility_invertedColors | |
| accessibility_monoAudio | |
| accessibility_voiceOver | |
| longitude | |
| media_photoALbums/0 | |
| media_photoAlbums/1 | |
| media_photoAlbums/2 | |
| media_photoAlbums/3 | |
| media_photoAlbums/4 | |
| media_photoAlbums/5 | |
| media_photoAlbums/6 | |
| media_photoAlbums/7 | |
| media_photoAlbums/8 | |
| ipAddress | |
| latitude | |
| device_info_batteryMonitoringEnabled | |
| device_info_iosVersion | |
| device_info_name | |

-continued

Table for Payload Data:

| Bluetooth Proximity Payload | Mobile Wallet Payload |
|---|---|
| device_info_identifierForVendor | |
| device_info_model | |
| timestamp | |
| Range | |
| powerTx | |
| beaconUUID | |
| sensorTypes | |
| sensorDataSets | |
| sensorNames | |

Corresponding processes, methods, devices, servers, computer readable media, are contemplated, including combinations and permutations of aspects described herein.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for electronically controlling a user's access to one or more controlled resources, the system comprising:
   a computer processor, operating with computer memory and a data storage device, the computer processor configured to:
      provision a near-field communication-based mobile credential data payload on a mobile device capable of establishing a contactless payment transaction, the near-field communication-based mobile credential data payload representative of an identity associated with the user;
      control a low energy proximity beacon to periodically broadcast a low energy proximity beacon signal adapted for receipt on a corresponding antenna on a mobile device associated with a user, the mobile device, upon receiving the beacon signal, transmitting a data packet indicative of a relative position characteristic of the mobile device;
      receive, at a near-field communication antenna, a tokenized data packet generated from the mobile credential data payload having a one-time use security code unique to a corresponding authentication action performed on the mobile device by the user;
      transmit, to a backend transaction processing platform, the tokenized data packet to emulate the contactless payment transaction;
      receive, from the backend transaction processing platform, a second data packet corresponding to representative of the identity associated with the user;
      determine that the identity is authorized to access the one or more controlled resources;
      validate the relative position characteristic of the mobile device against a spatial positioning criterion; and
      provision access to the one or more controlled resources.

2. The system of claim 1, wherein the determining that the identity is authorized to access the one or more controlled resources includes conducting a limited query only against a plurality of identities each associated with a corresponding mobile device having a relative position characteristic within a pre-defined distance from the low energy proximity beacon signal.

3. The system of claim 1, wherein the provisioning of access to the one or more controlled resources includes emulating an access control signal adapted for a corresponding access control device type of a plurality of access control device types.

4. The system of claim 1, wherein a plurality of low energy proximity beacon signals are broadcast, and the validating of the relative position characteristic of the mobile device against a spatial positioning criterion includes establishing a triangulated position based on at least two of the plurality of low energy proximity beacon signals.

5. The system of claim 4, wherein the processor is configured to:
   track the triangulated position of the mobile device to determine whether the mobile device has moved through a designated zone during a duration of time;
   upon a determination that the mobile device has not moved through the designated zone during the duration of time, triggering an alarm.

6. The system of claim 1, wherein the processor is configured to:
   track a plurality of relative position characteristics, each corresponding to a mobile device of a plurality of mobile devices proximate a source of the low energy proximity beacon signal;
   upon provisioning access to the one or more controlled resources, determine from the relative position characteristics which mobile devices entered an area associated with the one or more controlled resources; and
   upon determination of a mobile device associated with an identity that was not validated for access to the one or more controlled resources entering the area associated with the one or more controlled resources, trigger an alarm.

7. The system of claim 1, wherein the processor is configured to:
   track a plurality of relative position characteristics, each corresponding to a mobile device of a plurality of mobile devices proximate a source of the low energy proximity beacon signal;
   upon provisioning access to the one or more controlled resources, determine from the relative position characteristics or external data sets a number of mobile devices that entered or are present in an area associated with the one or more controlled resources; and
   upon determination that the number of mobile devices that entered or are present in an area associated with the one or more controlled resources do not match a number of validated mobile devices, trigger an alarm.

8. The system of claim 1, wherein the determining that the identity is authorized to access the one or more controlled resources includes conducting one or more challenges based on a security level associated with the one or more controlled resources.

9. The system of claim 8, wherein at least one of the one or more challenges is only conducted upon a determination that the relative position characteristic of the mobile device indicates that the mobile device is proximate to a beacon signal source.

10. The system of claim 1, wherein the validating of the relative position characteristic of the mobile device against a spatial positioning criterion includes validating a relative position characteristic of a second mobile device configured for dual authentication.

11. A method for electronically controlling a user's access to one or more controlled resources, the method comprising:
provisioning a near-field communication-based mobile credential data payload on a mobile device capable of establishing a contactless payment transaction, the near-field communication-based mobile credential data payload representative of an identity associated with the user;
controlling a low energy proximity beacon to periodically broadcast a low energy proximity beacon signal adapted for receipt on a corresponding antenna on a mobile device associated with a user, the mobile device, upon receiving the beacon signal, transmitting a data packet indicative of a relative position characteristic of the mobile device;
receiving, at a near-field communication antenna, a tokenized data packet generated from the mobile credential data payload having a one-time use security code unique to a corresponding authentication action performed on the mobile device by the user;
transmitting, to a backend transaction processing platform, the tokenized data packet to emulate the contactless payment transaction;
receiving, from the backend transaction processing platform, a second data packet corresponding to representative of the identity associated with the user;
determining that the identity is authorized to access the one or more controlled resources;
validating the relative position characteristic of the mobile device against a spatial positioning criterion; and
provisioning access to the one or more controlled resources.

12. The method of claim 11, wherein the determining that the identity is authorized to access the one or more controlled resources includes conducting a limited query only against a plurality of identities each associated with a corresponding mobile device having a relative position characteristic within a pre-defined distance from the low energy proximity beacon signal.

13. The method of claim 11, wherein the provisioning of access to the one or more controlled resources includes emulating an access control signal adapted for a corresponding access control device type of a plurality of access control device types.

14. The method of claim 11, wherein a plurality of low energy proximity beacon signals are broadcast, and the validating of the relative position characteristic of the mobile device against a spatial positioning criterion includes establishing a triangulated position based on at least two of the plurality of low energy proximity beacon signals.

15. The method of claim 14, wherein the method further comprises:

tracking the triangulated position of the mobile device to determine whether the mobile device has moved through a designated zone during a duration of time;
upon a determination that the mobile device has not moved through the designated zone during the duration of time, triggering an alarm.

16. The method of claim 11, wherein the method further comprises:
tracking a plurality of relative position characteristics, each corresponding to a mobile device of a plurality of mobile devices proximate a source of the low energy proximity beacon signal;
upon provisioning access to the one or more controlled resources, determine from the relative position characteristics which mobile devices entered an area associated with the one or more controlled resources; and
upon determination of a mobile device associated with an identity that was not validated for access to the one or more controlled resources entering the area associated with the one or more controlled resources, trigger an alarm.

17. The method of claim 11, comprising:
tracking a plurality of relative position characteristics, each corresponding to a mobile device of a plurality of mobile devices proximate a source of the low energy proximity beacon signal;
upon provisioning access to the one or more controlled resources, determining from the relative position characteristics or external data sets a number of mobile devices that entered or are present in an area associated with the one or more controlled resources; and
upon determining that the number of mobile devices that entered or are present in an area associated with the one or more controlled resources do not match a number of validated mobile devices, triggering an alarm.

18. The method of claim 11, wherein the determining that the identity is authorized to access the one or more controlled resources includes conducting one or more challenges based on a security level associated with the one or more controlled resources.

19. The method of claim 18, wherein at least one of the one or more challenges is only conducted upon a determination that the relative position characteristic of the mobile device indicates that the mobile device is proximate to a beacon signal source.

20. A non-transitory computer readable medium storing machine interpretable instructions, which when executed by a processor, cause the processor to perform a method for electronically controlling a user's access to one or more controlled resources, the method comprising:
provisioning a near-field communication-based mobile credential data payload on a mobile device capable of establishing a contactless payment transaction, the near-field communication-based mobile credential data payload representative of an identity associated with the user;
periodically broadcasting a low energy proximity beacon signal adapted for receipt on a corresponding antenna on a mobile device associated with a user, the mobile device, upon receiving the beacon signal, transmitting a data packet indicative of a relative position characteristic of the mobile device;
receiving, at a near-field communication antenna, a tokenized data packet generated from the mobile credential data payload having a one-time use security code unique to a corresponding authentication action performed on the mobile device by the user;

transmitting, to a backend transaction processing platform, the tokenized data packet to emulate the contactless payment transaction;
receiving, from the backend transaction processing platform, a second data packet corresponding to representative of the identity associated with the user;
determining that the identity is authorized to access the one or more controlled resources;
validating the relative position characteristic of the mobile device against a spatial positioning criterion; and
provisioning access to the one or more controlled resources.

* * * * *